(12) United States Patent
    Song

(10) Patent No.: US 11,074,623 B2
(45) Date of Patent: Jul. 27, 2021

(54) METHOD AND DEVICE FOR PUSHING INFORMATION

(71) Applicant: Advanced New Technologies Co., Ltd., Grand Cayman (KY)

(72) Inventor: Nian Song, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/721,857

(22) Filed: Dec. 19, 2019

(65) Prior Publication Data

US 2020/0134674 A1    Apr. 30, 2020

Related U.S. Application Data

(63) Continuation of application No. 16/210,988, filed on Dec. 5, 2018, which is a continuation of application No. PCT/CN2017/085653, filed on May 24, 2017.

(30) Foreign Application Priority Data

Jun. 6, 2016    (CN) .......................... 201610395230.1

(51) Int. Cl.
    G06Q 30/02    (2012.01)
    G06Q 50/00    (2012.01)
    H04L 29/08    (2006.01)

(52) U.S. Cl.
    CPC ......... G06Q 30/0269 (2013.01); G06Q 30/02 (2013.01); G06Q 30/0242 (2013.01);
    (Continued)

(58) Field of Classification Search
    None
    See application file for complete search history.

(56) References Cited

U.S. PATENT DOCUMENTS

5,872,952 A  *  2/1999  Tuan ..................... H01L 23/50
                                                 714/724
2005/0228778 A1* 10/2005 Perrone ................. G06F 16/334
(Continued)

FOREIGN PATENT DOCUMENTS

CN    103745105    4/2014
CN    104885114    9/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Kiersten V Summers
(74) *Attorney, Agent, or Firm* — Fish & Richardson P.C.

(57) ABSTRACT

The present disclosure discloses a method and device for pushing information to a target user. One example method includes identifying a plurality of users that meet a predetermined condition; selecting a target user from the identified users to be provided with information, where in the target user is selected based on a relationship strength and an influence of the identified users; and transmitting the information to the determined target user over a network, and relates to the field of information technologies.

15 Claims, 12 Drawing Sheets

(52) U.S. Cl.
CPC ......... *G06Q 30/0255* (2013.01); *G06Q 50/01* (2013.01); *H04L 67/26* (2013.01); *H04L 67/327* (2013.01)

(56) References Cited

U.S. PATENT DOCUMENTS

| | | | | |
|---|---|---|---|---|
| 2005/0246391 A1* | 11/2005 | Gross | .................... | G06F 16/958 |
| 2006/0010029 A1* | 1/2006 | Gross | .................... | G06Q 30/02 |
| | | | | 705/7.31 |
| 2006/0282282 A1* | 12/2006 | Spechler | ................ | G06Q 10/06 |
| | | | | 705/1.1 |
| 2008/0140506 A1* | 6/2008 | Christianson | .......... | G06Q 30/02 |
| | | | | 705/14.44 |
| 2008/0162260 A1* | 7/2008 | Rohan | ................ | G06Q 30/0269 |
| | | | | 705/14.4 |
| 2008/0282204 A1* | 11/2008 | Del Valle Lopez | .... | G06F 9/453 |
| | | | | 715/866 |
| 2009/0063254 A1* | 3/2009 | Paul | .................... | G06Q 30/0204 |
| | | | | 705/7.33 |
| 2010/0198660 A1* | 8/2010 | Armstrong | ......... | G06Q 10/0635 |
| | | | | 705/7.28 |
| 2011/0320447 A1* | 12/2011 | Chen | ..................... | G06F 16/285 |
| | | | | 707/737 |
| 2013/0132158 A1* | 5/2013 | L'Huillier | .......... | G06Q 30/0201 |
| | | | | 705/7.33 |
| 2014/0089323 A1* | 3/2014 | Wu | ........................ | G06Q 50/01 |
| | | | | 707/748 |
| 2014/0136521 A1* | 5/2014 | Pappas | ................... | G06Q 50/01 |
| | | | | 707/722 |
| 2014/0195239 A1* | 7/2014 | Evanini | ................... | G10L 25/60 |
| | | | | 704/254 |
| 2014/0288999 A1* | 9/2014 | Ovadia Amsalem | ........................ | |
| | | | | G06Q 30/0201 |
| | | | | 705/7.29 |
| 2014/0317032 A1* | 10/2014 | Haberman | ............. | G06N 20/00 |
| | | | | 706/12 |
| 2015/0120713 A1* | 4/2015 | Kim | ....................... | G06Q 50/01 |
| | | | | 707/723 |
| 2015/0215304 A1* | 7/2015 | Cao | ........................ | H04L 63/08 |
| | | | | 726/6 |
| 2015/0254322 A1* | 9/2015 | Ma | ........................ | G06F 16/182 |
| | | | | 707/603 |
| 2015/0269857 A1* | 9/2015 | Feng | ..................... | H04W 4/029 |
| | | | | 434/353 |
| 2015/0324861 A1 | 11/2015 | Hebbar et al. | | |
| 2015/0348042 A1* | 12/2015 | Jivraj | ................. | G06Q 20/4016 |
| | | | | 705/44 |
| 2016/0019579 A1* | 1/2016 | Sims | .................. | G06Q 30/0242 |
| | | | | 705/14.41 |
| 2016/0034974 A1* | 2/2016 | Neb | .................... | G06Q 30/0276 |
| | | | | 705/14.16 |
| 2016/0342705 A1* | 11/2016 | Zheng | ................... | G06F 16/958 |
| 2017/0154345 A1* | 6/2017 | Wang | .................... | G06Q 10/067 |
| 2019/0108552 A1 | 4/2019 | Song | | |

FOREIGN PATENT DOCUMENTS

| | | |
|---|---|---|
| CN | 105095256 | 11/2015 |
| CN | 105608179 | 5/2016 |
| JP | 2012519335 | 8/2012 |
| JP | 2015515676 | 5/2015 |
| JP | 2016512352 | 4/2016 |
| KR | 101297271 | 8/2013 |
| KR | 20150008485 | 1/2015 |
| KR | 101624680 | 5/2016 |
| TW | 201443811 | 11/2014 |
| TW | 201443812 | 11/2014 |
| WO | WO 2013123462 | 8/2013 |

OTHER PUBLICATIONS

European Extended Search Report in European Application No. 17809630.1, dated Feb. 28, 2019, 11 pages.
International Search Report by the International Searching Authority issued in International Application No. PCT/CN2017/085653 dated Aug. 30, 2017; 8 pages.
Mei et al., "Finding and analyzing principal features for measuring user influence on Twitter," 2015 IEEE First International Conference on Big Data Computing Service and Applications, 2015, 478-486.
Nakamoto, "Bitcoin: A Peer-to-Peer Electronic Cash System," www.bitcoin.org, 2005, 9 pages.
PCT International Preliminary Report on Patentability in International Application No. PCT/CN2017/085653, dated Dec. 11, 2018, 8 pages (with English translation).
PCT Written Opinion of the International Searching Authority in International Application No. PCT/CN2017/085653, dated Aug. 30, 2017, 7 pages (with English translation).
Zhong et al., "User behavior learning and transfer in composite social networks," ACM Transactions on Knowledge Discovery from Data (TKDD), 2014, 8(1):1-32.

* cited by examiner

METHOD AND DEVICE FOR PUSHING INFORMATION

CROSS-REFERENCE TO RELATED APPLICATIONS

This application is a continuation of U.S. application Ser. No. 16/210,988, filed on Dec. 5, 2018, which is a continuation of PCT Application No. PCT/CN2017/085653, filed on May 24, 2017, which claims priority to Chinese Patent Application No. 201610395230.1, filed on Jun. 6, 2016, and each application is hereby incorporated by reference in its entirety.

TECHNICAL FIELD

The present disclosure relates to the field of information technologies, and in particular, to a method and device for pushing information.

BACKGROUND

With the continuous development of information technologies and Internet technologies, various application programs are emerging, and the number and quality of the application program users are prerequisites for the application programs' sustainability and development. To attract and obtain more users, in the early stage of new applications, many application program providers deliver advertisements, that is, push application program information to the users.

At present, during an information pushing process, by using a predetermined scoring model to select users, usually a user who predetermined information is to be pushed receive such information directly. The predetermined scoring model is generated based on user results and user attributes previously obtained by application programs. That is, potential users are scored based on the predetermined scoring model, and then the user with the highest score is selected from the potential users to receive the pushed information. However, if the user who predetermined information is to be pushed is directly selected by using the predetermined scoring model, and then application program information is pushed to the user, it can be only ensured that the selected user itself is converted into an application program user who performs information pushing, and more application program users that are initially not included in the predetermined scoring model cannot be obtained, resulting in an inability to increase advertisement budget benefits of the application programs and relatively low information pushing efficiency.

SUMMARY

In view of this, implementations of the present disclosure provide a method and device for pushing information, so as to resolve a problem of relatively low information pushing efficiency.

To achieve the previous objective, the following technical solutions are provided in the present disclosure.

An implementation of the present disclosure provides a method for pushing information, including: obtaining multiple users who meet a predetermined condition; selecting, based on relationship strength among the multiple users and influence of the multiple users, a user who predetermined information is to be pushed from the multiple users; and pushing information to the user who predetermined information is to be pushed.

An implementation of the present disclosure provides a device for pushing information, including: an acquisition unit, configured to obtain multiple users who meet a predetermined condition; a selection unit, configured to select, from the multiple users based on relationship strength among the multiple users obtained by the acquisition unit and influence of the multiple users, a user who predetermined information is to be pushed; and a pushing unit, configured to push information to the user who predetermined information is to be pushed and that is selected by the selection unit.

An implementation of the present disclosure provides a method for determining a target user, including: obtaining multiple users who meet a predetermined condition; selecting, from the multiple users based on influence respectively corresponding to the multiple users, a user whose influence meets a predetermined influence condition; and determining the user whose influence meets the predetermined influence condition, as a target user.

An implementation of the present disclosure provides a device for determining a target user, including: an acquisition unit, configured to obtain multiple users who meet a predetermined condition; a selection unit, configured to select, from the multiple users based on influence respectively corresponding to the multiple users obtained by the acquisition unit, a user whose influence meets a predetermined influence condition; and a determining unit, configured to determine the user whose influence meets the predetermined influence condition and that is selected by the selection unit, as a target user.

The technical solutions provided in the implementations of the present disclosure have at least the following advantages:

In a method and device for pushing information provided in the implementations of the present disclosure, first obtain multiple users who meet a predetermined condition; then, a user who predetermined information is to be pushed is selected from the multiple users based on relationship strength among the multiple users and influence of the multiple users; and finally, information is pushed to the user who predetermined information is to be pushed. Compare to current method that a user who predetermined information is to be pushed is directly selected and then the information is pushed to the user, in the implementations of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

The previous descriptions are merely an overview of the technical solutions of the present disclosure. For better understanding of the technical means of the present disclosure, the previous descriptions can be implemented based on content of the specification, and to make the previous and other objectives, features, and advantages of the present disclosure more comprehensible, specific implementations of the present disclosure are described as follows.

BRIEF DESCRIPTION OF DRAWINGS

It becomes clear for a person skilled in the art to learn various other advantages and benefits by reading detailed description of the following preferred implementations. Accompanying drawings are merely used for showing the preferred implementations, but not considered as a limitation on the present disclosure. In all accompanying drawings, the same reference symbol is used to indicate the same part. In the accompanying drawings.

DESCRIPTION OF IMPLEMENTATIONS

The following describes the example implementations of the present disclosure in more detail with reference to the accompanying drawings. Although the accompanying drawings show the implementations of the present disclosure that are used as examples, it should be understood that the present disclosure can be implemented in various forms, and shall not be limited by the implementations described here. On the contrary, these implementations are provided for a clearer understanding of the present disclosure, and to comprehensively convey the scope of the present disclosure to the person skilled in the art.

Figure 1:
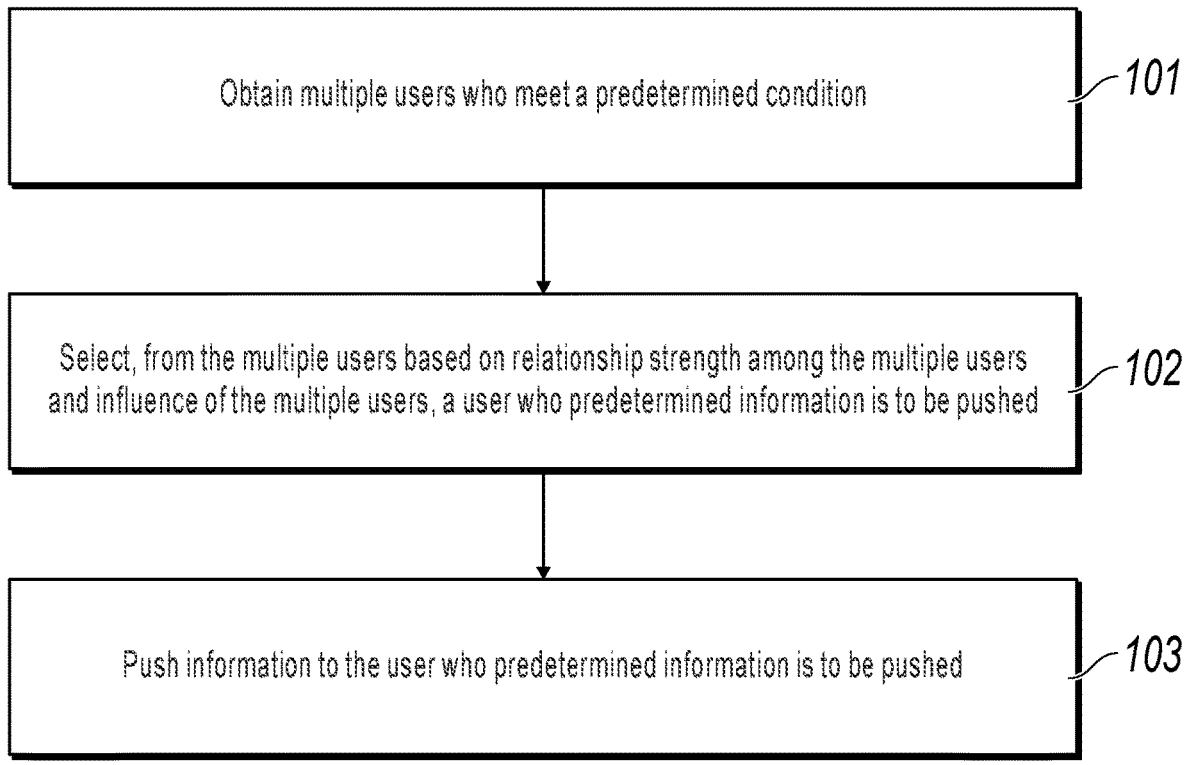
FIG. 1 shows a flowchart illustrating a method for pushing information, according to an implementation of the present disclosure.

An implementation of the present disclosure provides a method for pushing information. As shown in FIG. 1, the method includes the following steps.

101. Obtain multiple users who meet a predetermined condition.

The predetermined condition can be set based on a requirement of a user, or can be set based on a system requirement, which is not limited in the implementation of the present disclosure. The multiple users can be multiple users whose scores meet a predetermined score condition. A user whose score meets the predetermined score condition can be selected by using a predetermined scoring model.

The predetermined scoring model is generated based on user results and user attributes historically obtained by application programs. The user results historically obtained by the application programs can include a potential user historically obtained by the application programs and a user converted into an application program user. The predetermined score condition can be set based on a requirement of a user, or can be set based on a system requirement, which is not limited in the implementation of the present disclosure. For example, the predetermined score condition can be 750 users with highest scores in potential users, or can be users whose scores are greater than or equal to 0.8 point in the potential users.

In this implementation of the present disclosure, before generating the predetermined scoring model, an information pushing sample user and attribute data of the sample user need to be obtained by using an information pushing method with unspecified target user. Then, the attribute data of the sample user is processed to obtain characteristic data for generating the predetermined scoring model. The characteristic data for generating the predetermined scoring model needs to be complete without loss and accurate without anomaly, and have a data format conforming to a scoring model generation standard.

The information pushing method for ambiguously specifying a target user is used to deliver and display application program advertisements on various channels and ambiguously limit users who the advertisements are to be delivered. The information pushing method for ambiguously specifying a target user can be used to obtain more users to push information. After the information is pushed, information collected by a program embedded on an advertisement channel can be used to push user attribute data.

Figure 9:
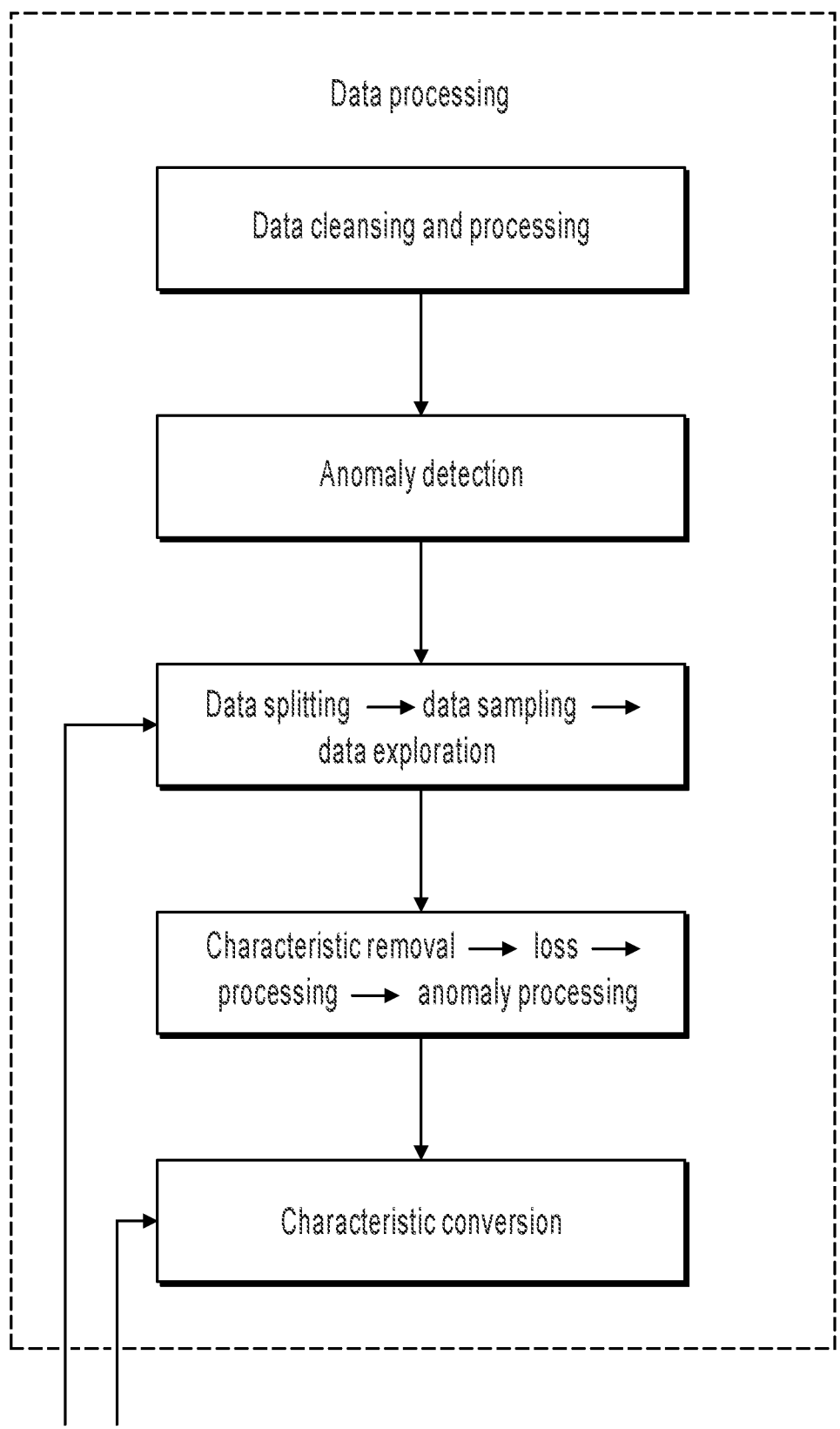
FIG. 9 shows a flowchart illustrating a data processing method, according to an implementation of the present disclosure.

For the user attribute data in this implementation of the present disclosure, a data processing method is described here, as shown in FIG. 9:

1. Data cleansing and processing: Sample users and attribute data of the sample users are collected by using an embedded program on a channel. There are usually advertisements of multiple application programs or products on the same channel. Collected sample users can include an advertisement user of another application program. Alternatively, some of the attribute data of the sample users is not characteristic data for generating the scoring model. Therefore, there is a need to cleanse and process the sample users and the attribute data of the sample users. For example, collected user assets data is assets data of a user in different assets accounts, but assets data for generating the score model is the total assets data of the user. Therefore, there is a need to obtain the total assets data of the user based on the assets data of the user in the different assets accounts.

2. Anomaly detection: The sample users and the attribute data of the sample users are parsed out by using log information collected by the embedded program on the channel, and the data parsed out from the log information can include some dirty data. For example, some garbled characters can exist in brand data of the user's mobile phone, and the number of times of visiting application program advertisements by the user can be excessive. It can be caused by malicious machine access attacks. The dirty data can affect the generation of the scoring model. Therefore, it is necessary to detect whether there is dirty data in the attribute data of the sample users.

3. Data splitting→data sampling→data exploration: There can be a very large ratio of users, in the sampled users, that are converted into application program users, to potential users of the application programs; or a very large ratio of potential users of the application programs to users, in the sampled users, that are converted into application program users. Therefore, the attribute data of the sample users can be over-sampled or under-sampled, so a scoring model generation algorithm can effectively learn of attribute feature of a user to be converted into an application program user.

4. Characteristic removal→loss processing→anomaly processing: Most scoring model generation algorithms do not support sample data with lost data or sample data with too much attribute characteristic information. Sample data with too much lost attribute characteristic data and sample data with too many attribute characteristic types are removed. Attribute characteristic data processing is performed on sample data with less lost attribute characteristic data, that is, the lost attribute characteristic data is filled. Data of a numeric type can be filled using a median, and data of a discrete type can be filled using a mode. For example, if the user attribute data lacks age data of a certain user, the median of age data of the sample users can be used as the age data of the user. In addition, to prevent the scoring model from being affected by some abnormal data, it is usually necessary to process the abnormal data, for example, the abnormal data is replaced with 99 quantile.

5. Characteristic conversion: Because the model algorithm in the scoring model algorithm supports only the sparse matrix and does not support a normal bi-dimensional table, it is necessary to convert the format of the attribute data to obtain the characteristic data for generating the scoring model. For example, the format of the characteristic data can be converted through logarithm transformation to obtain the characteristic data for generating the scoring model.

Figure 10:
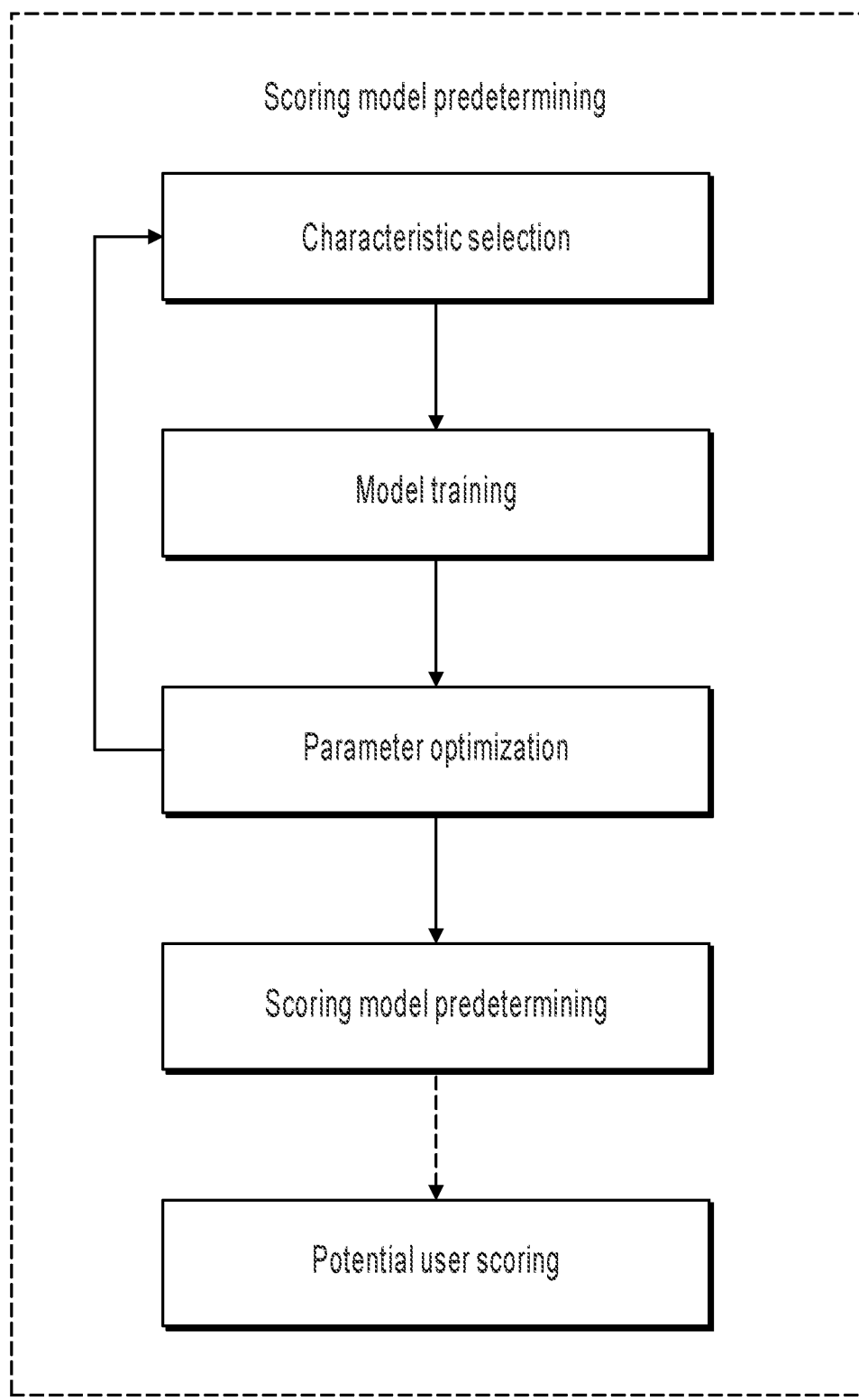
FIG. 10 shows a flowchart illustrating a method for generating a predetermined scoring model, according to an implementation of the present disclosure.

In this implementation of the present disclosure, as shown in FIG. 10, a method for generating the predetermined scoring model is described here.

1. Characteristic selection: Obtain the characteristic data for generating the scoring model and the scoring model generation algorithm. The scoring model generation algorithm can be a decision tree algorithm, a logical regression algorithm, a random forest algorithm, an iterative decision tree algorithm like Gradient Boosting Decision Tree (GBDT), etc.

2. Model training: Train multiple scoring models based on the characteristic data for generating the scoring model and the scoring model generation algorithm.

3. Parameter optimization: Obtain scoring effects of each scoring model based on parameters in the scoring model generation algorithm and different combinations of the characteristic data. The scoring effects of the scoring models can be measured based on a model scoring effect measurement standard. The model scoring effect measurement standard can be an area under a curve, and a larger area under a curve indicates a better scoring effect of a scoring model.

4. Scoring model predetermining: Select a scoring model with the best scoring effect from multiple scoring models, and determine the scoring model with the best scoring effect as the predetermined scoring model for selecting a user whose score meets the predetermined condition.

5. Potential user scoring: Score the potential users based on the predetermined scoring model, and then select the user whose score meets the predetermined condition from the potential users.

102. Select, from the multiple users based on relationship strength among the multiple users and influence of the multiple users, a user who predetermined information is to be pushed.

The relationship strength among the multiple users can be similarity among attribute information of the multiple users. Influence of a user refers to capability strength that the user affects other users, and can be the number of times of reading, sharing, and forwarding information published by the user by other users.

The predetermined information to be pushed can be advertisement information that is pushed by an application program provider based on advertisement budget. To avoid high costs on application program advertisements, many application program providers usually budget advertisement costs, that is, determine information pushing user data based on the advertisement budget and push information only to users in the information pushing user data.

For example, advertisement costs corresponding to an application program is five million, advertisement costs of each user is 1 RMB, and there are five million users who the predetermined information is to be pushed. 7.5 million users with highest scores are selected by using the predetermined scoring model, and five million users who predetermined information is to be pushed are selected based on relationship strength among the users and influence of the users, from the 7.5 million users selected by using the predetermined scoring model.

In this implementation of the present disclosure, multiple users whose scores meet the predetermined condition are selected by using the predetermined scoring model, and then a user who predetermined information is to be pushed is selected from the multiple users based on relationship strength among the multiple users and influence of the multiple users. As such, the user who predetermined information is to be pushed can be converted into an application program user who performs information pushing, and more users can be obtained for the application program by using influence and broadcast capabilities of the user and by ways of sharing, forwarding, or praising, thereby increasing advertisement budget benefits of the application program and improving information pushing efficiency.

103. Push information to the user who predetermined information is to be pushed.

In a method for pushing information provided in this implementation of the present disclosure, first, multiple users who meet a predetermined condition are obtained; then, a user who predetermined information is to be pushed is selected from the multiple users based on relationship strength among the multiple users and influence of the multiple users; and finally, information is pushed to the user who predetermined information is to be pushed. At present, a user who predetermined information is to be pushed is directly selected and then information is pushed to the user. By comparison, in this implementation of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

Figure 2:
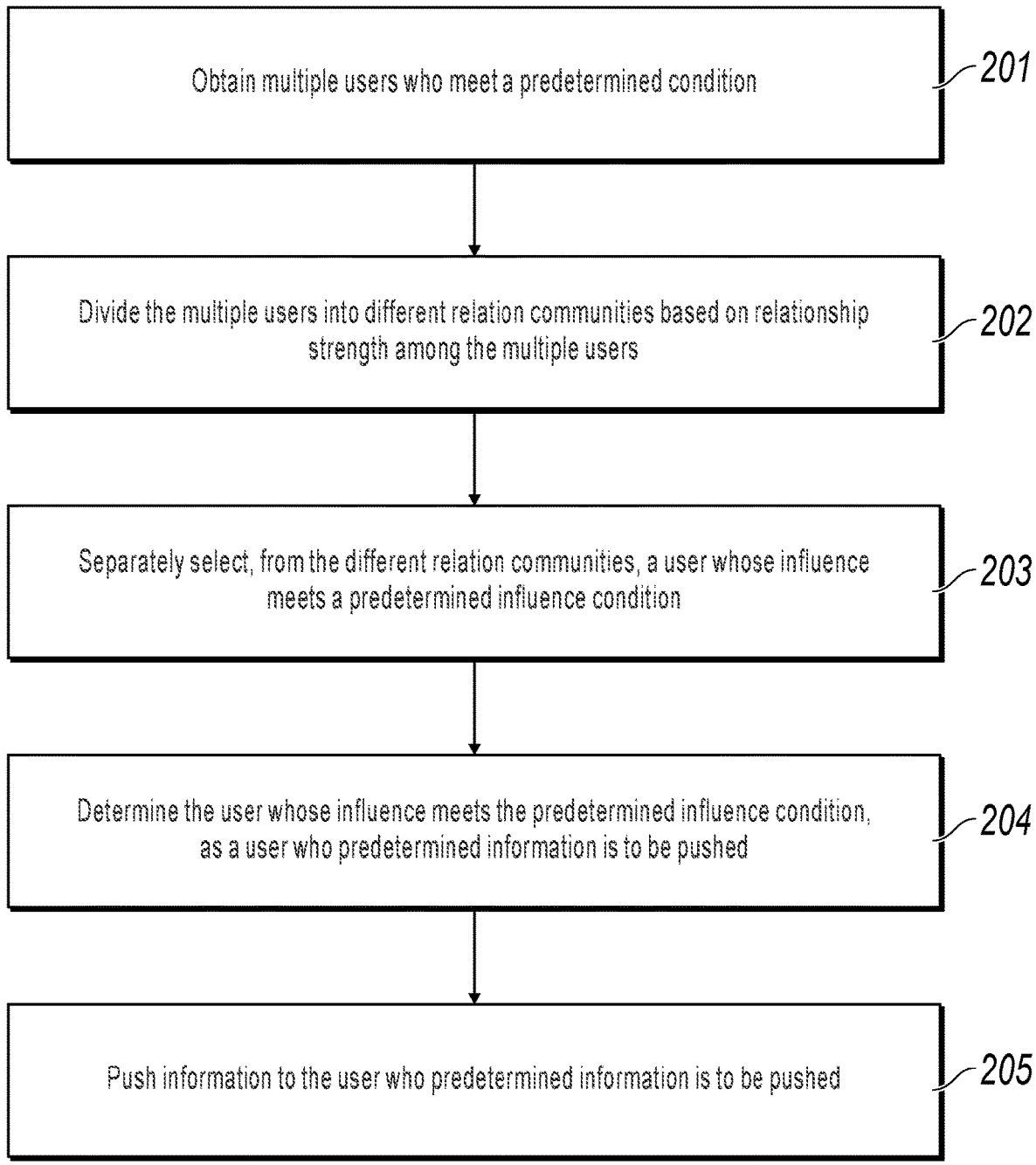
FIG. 2 shows a flowchart illustrating another method for pushing information, according to an implementation of the present disclosure.

An implementation of the present disclosure provides another method for pushing information. As shown in FIG. 2, the method includes the following steps.

201. Obtain multiple users who meet a predetermined condition.

An explanation of the user meeting the predetermined condition and a process of obtaining the multiple users meeting the predetermined condition have been described in detail in step 101, and details are omitted in this implementation of the present disclosure here.

202. Divide the multiple users into different relation communities based on relationship strength among the multiple users.

Relationship strength between users stored in each relation community is greater than a predetermined threshold. The relation community can be a relation network community, and can be an online communication space such as a forum, a bulletin board, a group discussion, online chat, networking, personal space, and a wireless value-added service. Users in the same relation community have the same relation community label. The predetermined threshold can be set based on a requirement of a user or can be set based on a default system mode, which is not limited in the implementation of the present disclosure. For example, the predetermined threshold can be 0.4 or 0.5.

In this implementation of the present disclosure, before step 202, the method further includes obtaining initial relation community labels of the multiple users. Step 202 can include updating the initial relation community label of each user in the multiple users to a relation community label of a user whose relationship strength with the user is greater than the predetermined threshold, and dividing users with the same relation community label in the multiple users into the same relation community.

For example, if the predetermined threshold is 0.4, multiple users selected by using a predetermined scoring model are user 1, user 2, user 3, and user 4. Relationship strength between user 1 and user 2 is 0.1, relationship strength between user 1 and user 3 is 0.4, relationship strength between user 1 and user 4 is 0.2, and relationship strength between user 1 and user 3 is greater than or equal to 0.4. Therefore, a relation community label of user 1 is updated to a relation community label of user 3. In the same way, relation community labels of user 2, user 3, and user 4 can be updated.

A relation community dividing process is an iterative process. When the first iteration is performed, the initial relation community labels of the multiple users are obtained, and the initial relation community label of each user in the multiple users can be an identity (ID) of the user. During iterations after the first iteration, the relation community label of each user is a relation community label updated based on relationship strength between users.

In this implementation of the present disclosure, before dividing users with the same relation community label into the same relation community, the method further includes obtaining the number of relation community label updates; and determining whether the number of relationship community label updates is greater than a predetermined threshold.

The predetermined count threshold can be set based on a requirement of a user or can be set based on a default system mode, which is not limited in the implementation of the present disclosure. For example, the predetermined count threshold can be 100, 150, or 200.

The step of dividing users with the same relation community label in the multiple users into the same relation community includes dividing users with the same relation community label in the multiple users into the same relation community, if the relation community label update count of the user is greater than the predetermined count threshold.

For example, if the predetermined count threshold is 100, when the relation community label update count of the user is 50, it indicates that division of the relation community is not completed, and the relation community label of the user needs to be continuously updated based on the relationship strength between the users. When the relation community label update count of the user is 100, it indicates that division of the relation community is completed.

In this implementation of the present disclosure, after the determining whether the relation community label update count of the user is greater than the predetermined count threshold, the method further includes updating the relation community label of the user to a relation community label of a user whose relationship strength with the user is greater than the predetermined threshold, if the relation community label update count of the user is less than or equal to the predetermined count threshold.

203. Separately select, from the different relation communities, a user whose influence meets a predetermined influence condition.

In this implementation of the present disclosure, when the influence is influence index information, step 203 can be: separately selecting, from the different relation communities based on the influence index information, a user whose influence index information is greater than or equal to predetermined influence index information.

The influence index can be the number of times that other users read, share, or forward information that is published by the user. The predetermined influence index threshold can be set based on a requirement of a user, or can be set based on a default system mode. The predetermined influence index threshold can be set based on a budget of predetermined information to be pushed, and this is not limited in this implementation of the present disclosure.

For example, advertisement budget of predetermined advertisements is three million, and the number of users who the predetermined advertisements are to be pushed is three million. Three million users need to be selected from the relation communities, users in the relation communities are sorted in descending order of influence indexes, and the predetermined influence index threshold is set based on an influence index of the No. three million user.

In another example, when the influence index can be the number of times that other users reading the information published by the user, the predetermined influence index threshold can be the threshold of times to read the predetermined published information by other users, for example, can be 50,000. When the influence index can be the number of times of sharing the information published by the user by other users, the predetermined influence threshold can be the threshold of times of sharing the predetermined published information by other users, for example, can be 100,000. When the influence index can be the number of times of forwarding the information published by the user by other users, the predetermined influence index threshold can be the threshold of times of forwarding the predetermined published information by other users, for example, can be 80,000.

204. Determine the user whose influence meets the predetermined influence condition as a user who predetermined information is to be pushed.

In this implementation of the present disclosure, when the influence is the influence index information, step 204 can be:

determining a user whose influence index information is greater than or equal to the predetermined influence index threshold, as a user who predetermined information is to be pushed.

Figure 11:
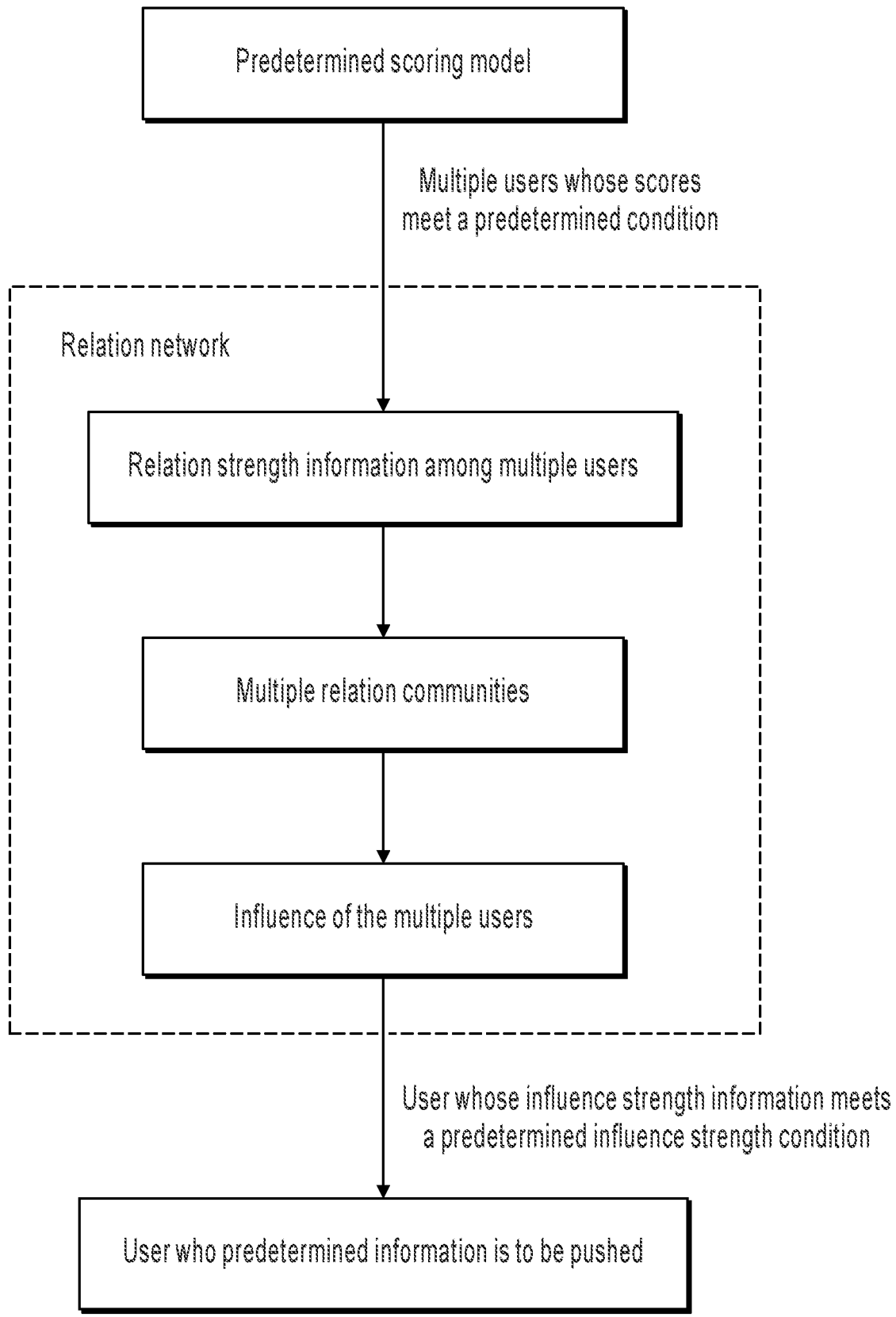
FIG. 11 shows a flowchart illustrating selection of a user who predetermined information is to be pushed, according to an implementation of the present disclosure.

In this implementation of the present disclosure, a complete process of selecting the user who predetermined information is to be pushed is shown in FIG. 11: First, multiple users whose scores meet a predetermined condition are selected by using a predetermined scoring model; then, the multiple users are divided into different relation communities based on relationship strength among the multiple users; and finally, a user whose influence meets a predetermined influence condition is selected from the different relation communities, and the user whose influence meets the predetermined influence condition is determined as a user who predetermined information is to be pushed.

205. Push information to the user who predetermined information is to be pushed.

In this implementation of the present disclosure, a specific application scenario can be shown in the following, but is not limited thereto: There are five million users who an application program advertisement is to be pushed, and 7.5 million users with higher scores are selected, by using a predetermined scoring model, from potential users obtained based on historical information pushing, where 7.5 million is 1.5 times of five million. Influence of each user in the 7.5 million users and relationship strength between each user and other users are obtained. Based on the relationship strength between each user and the other users, four relation communities are obtained, including relation community 1, relation community 2, relation community 3, and relation community 4. Users with the strongest influence and whose quantity is ⅔ of the number of users in each relation community are selected in order to obtain five million users. The five million users selected from the relation communities are determined as users who the application program advertisement is to be pushed, and information is pushed to the users.

In another method for pushing information provided in this implementation of the present disclosure, first, multiple users who meet a predetermined condition are obtained; then, a user who predetermined information is to be pushed is selected from the multiple users based on relationship strength among the multiple users and influence of the multiple users; and finally, information is pushed to the user who predetermined information is to be pushed. At present, a user who predetermined information is to be pushed is directly selected and information is pushed to the user. By comparison, in this implementation of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

Figure 3:
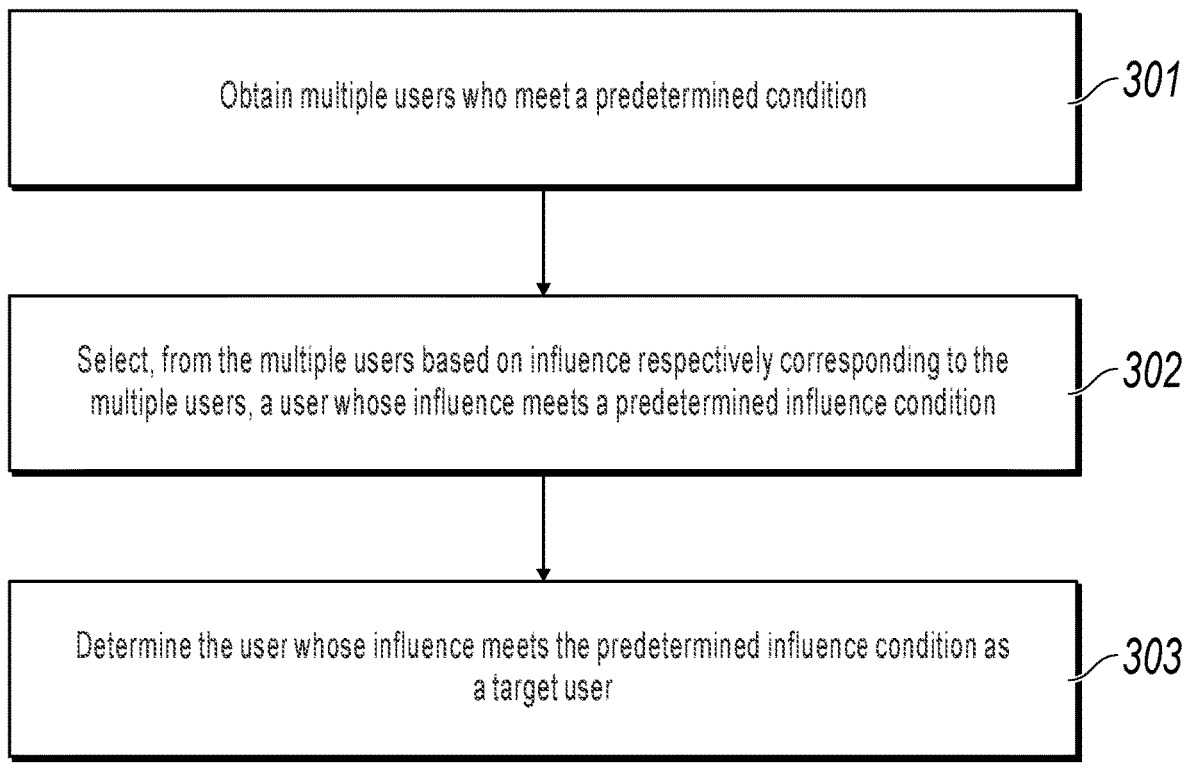
FIG. 3 shows a flowchart illustrating a method for determining a target user, according to an implementation of the present disclosure.

An implementation of the present disclosure provides a method for determining a target user. As shown in FIG. 3, the method includes the following steps.

301. Obtain multiple users who meet a predetermined condition.

An explanation of the user meeting the predetermined condition and a process of obtaining the multiple users meeting the predetermined condition have been described in detail in step 101, and details are omitted in this implementation of the present disclosure here.

302. Select, from the multiple users based on influence respectively corresponding to the multiple users, a user whose influence meets a predetermined influence condition.

The predetermined influence condition can be set based on a requirement of a user or can be set based on a default system mode, which is not limited in this implementation of the present disclosure. For example, the predetermined influence condition can be that an influence level is high, or can be that an influence index is greater than or equal to 50,000 times.

303. Determine the user whose influence meets the predetermined influence condition as a target user.

The target user can be a user who predetermined information is to be pushed.

For example, the predetermined influence condition is as follows: The influence level is high. First, eight million users with the highest scores are obtained, and there are five million users whose influence levels are high in the eight million users with the highest scores. Then the five million users whose influence levels are high are determined as users who predetermined information is to be pushed.

In a method for determining a target user provided in this implementation of the present disclosure, first, multiple users who meet a predetermined condition are obtained; then, a user who predetermined information is to be pushed is selected from the multiple users based on relationship strength among the multiple users and influence of the multiple users; and finally, information is pushed to the user who predetermined information is to be pushed. At present, a user who predetermined information is to be pushed is directly selected and information is pushed to the user. By comparison, in this implementation of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

Figure 4:
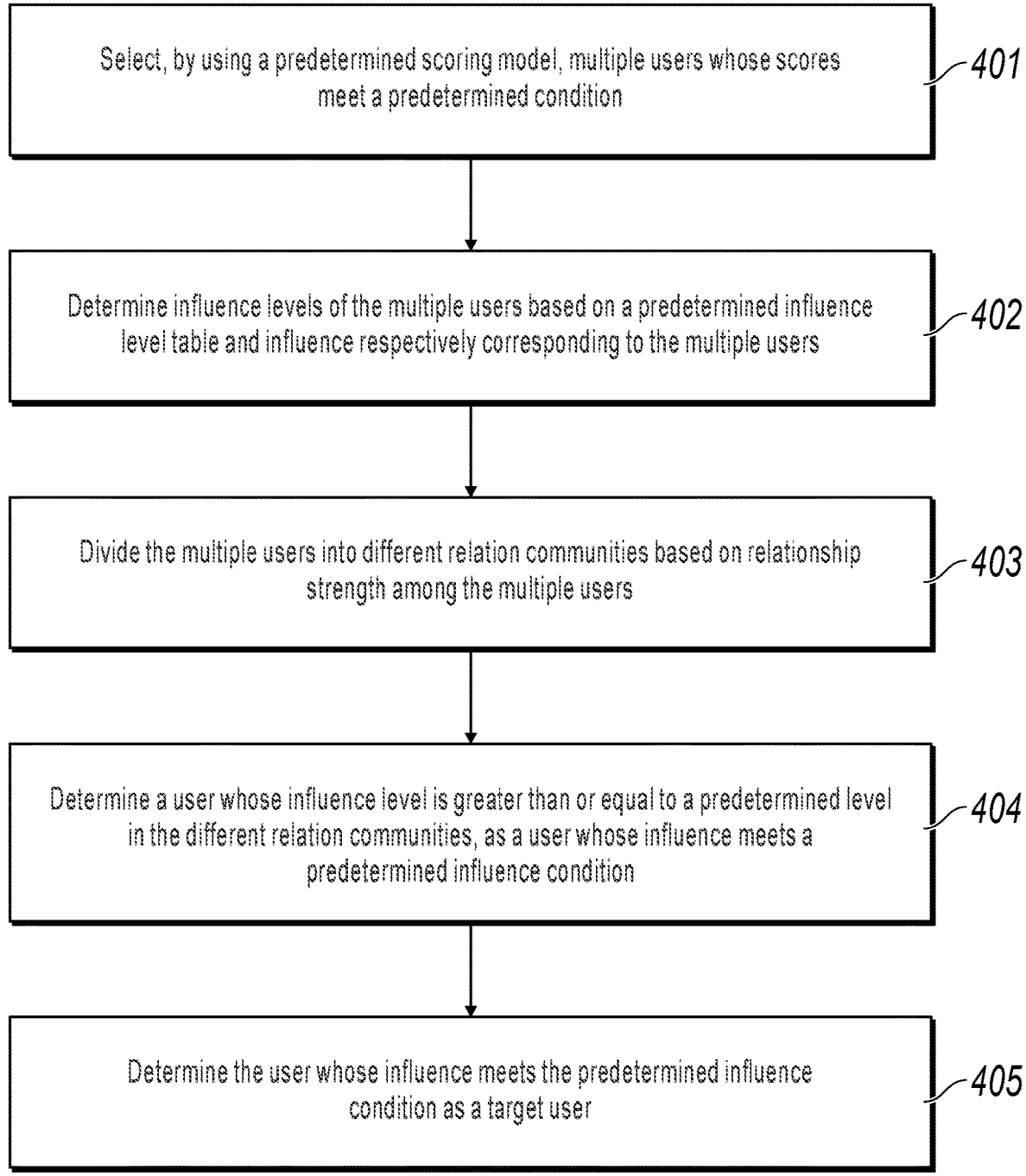
FIG. 4 shows a flowchart illustrating another method for determining a target user, according to an implementation of the present disclosure.

An implementation of the present disclosure provides another method for determining a target user. As shown in FIG. 4, the method includes the following steps.

401. Select, by using a predetermined scoring model, multiple users whose scores meet the predetermined condition.

An explanation of the predetermined scoring model and a process of selecting the multiple users whose scores meet the predetermined condition by using the predetermined scoring model have been described in detail in step 101, and details are omitted in this implementation of the present disclosure here.

402. Determine influence levels of the multiple users based on a predetermined influence level table and influence respectively corresponding to the multiple users.

The predetermined influence level table stores influence threshold intervals respectively corresponding to different influence levels. The influence levels can be divided into three levels: high, medium, low; or four levels: high, medium, sub-medium, and low.

For example, the influence levels are divided into three levels: high, medium, and low. When the influence level is high, a corresponding influence threshold interval is (50000, 100000). When the influence level is medium, a corresponding influence threshold interval is (5000, 50000). When the influence level is low, a corresponding influence threshold interval is (0, 5000). When influence of a user is 4000, an influence level of the user is low, and when the influence of the user is 80000, the influence level of the user is high.

In this implementation of the present disclosure, before step 402, the method further includes: establishing a mapping relationship between different influence levels and different influence threshold intervals, and storing the mapping relationship in the predetermined influence level table.

403. Divide the multiple users into different relation communities based on relationship strength among the multiple users.

Relationship strength between users stored in each relation community is greater than a predetermined threshold. The predetermined threshold can be set based on a requirement of a user or can be set based on a default system mode, which is not limited in the implementation of the present disclosure. For example, the predetermined threshold can be 0.5 or 0.6.

In this implementation of the present disclosure, before step 403, the method further includes: obtaining initial relation community labels of the multiple users. Step 403 can be: updating the initial relation community label of each user in the multiple users to a relation community label of a user whose relationship strength with the user is greater than the predetermined threshold, and dividing users with the same relation community label in the multiple users into the same relation community.

Before the dividing users with the same relation community label in the multiple users into the same relation community, the method further includes: obtaining a relation community label update count of the user; and determining whether the relation community label update count of the user is greater than a predetermined count threshold. The dividing users with the same relation community label in the multiple users into the same relation community includes dividing users with the same relation community label in the multiple users into the same relation community, if the relation community label update count of the user is greater than the predetermined count threshold.

In this implementation of the present disclosure, after the determining whether the relation community label update count of the user is greater than the predetermined count threshold, the method further includes updating the relation community label of the user to a relation community label of a user whose relationship strength with the user is greater than the predetermined threshold, if the relation community label update count of the user is less than or equal to the predetermined count threshold.

404. Determine a user whose influence level is greater than or equal to a predetermined level in the different relation communities, as a user whose influence meets a predetermined influence condition.

The predetermined level can be set based on a requirement of a user or can be set based on a default system mode, which is not limited in the implementation of the present disclosure. For example, if the predetermined level is high, a user whose influence level is high is determined as a user whose influence meets the predetermined influence condition.

For example, when the predetermined level is high, 7.5 million users are obtained by using the predetermined scoring model. Based on relationship strength among the users, the 7.5 million users are divided into five relation communities: relation community 1, relation community 2, relation community 3, relation community 4, and relation community 5. Users whose influence levels are high are selected from relation community 1, relation community 2, relation community 3, relation community 4, and relation community 5, and are determined as users whose influence meets the predetermined influence condition.

405. Determine the user whose influence meets the predetermined influence condition as a target user.

The target user can be a user who predetermined information is to be pushed.

In another method for determining a target user provided in this implementation of the present disclosure, first, multiple users who meet a predetermined condition are obtained; then, a user who predetermined information is to be pushed is selected from the multiple users based on relationship strength among the multiple users and influence of the multiple users; and finally, information is pushed to the user who predetermined information is to be pushed. At present, a user who predetermined information is to be pushed is directly selected and information is pushed to the user. By comparison, in this implementation of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

Figure 5:
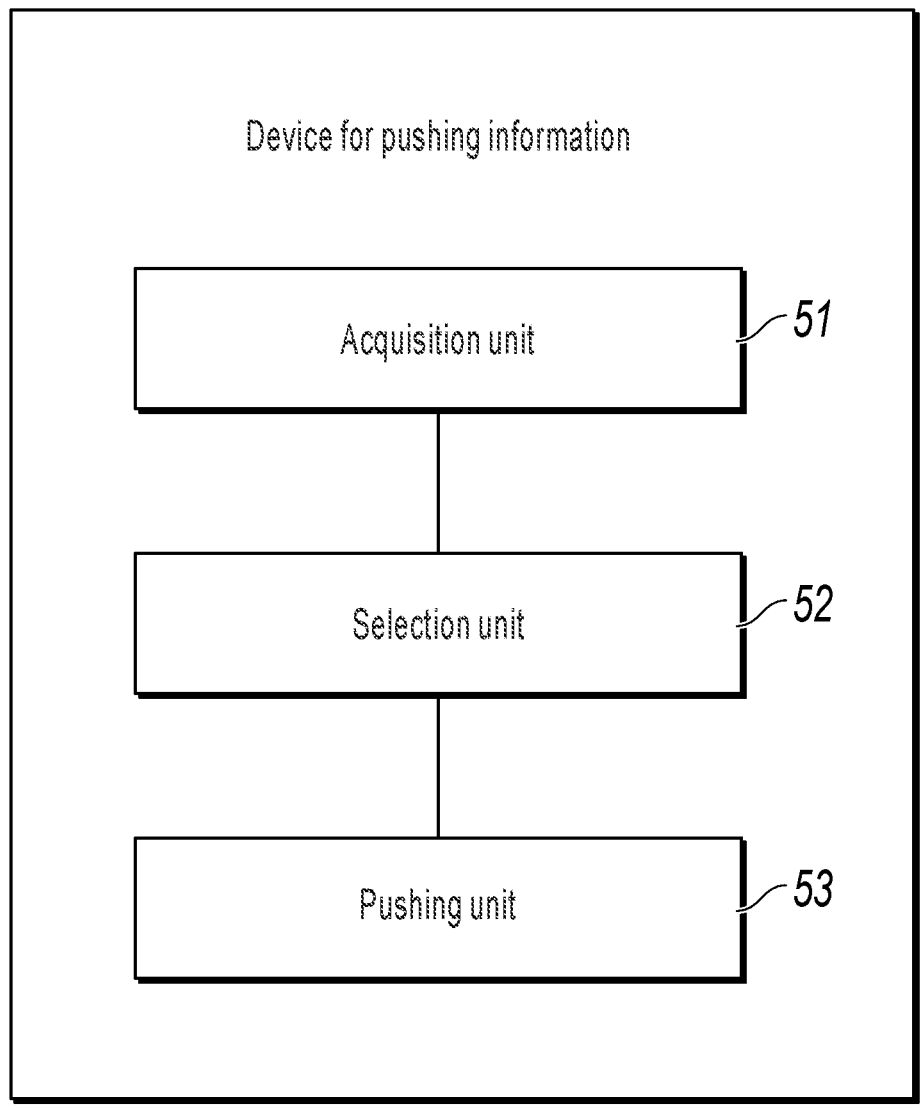
FIG. 5 shows a schematic structural diagram illustrating a device for pushing information, according to an implementation of the present disclosure.

Further, as a specific implementation of the method shown in FIG. 1, an implementation of the present disclosure provides a device for pushing information. As shown in FIG. 5, the device can include an acquisition unit 51, a selection unit 52, and a pushing unit 53.

The acquisition unit 51 is configured to obtain multiple users who meet a predetermined condition.

The selection unit 52 is configured to select, from the multiple users based on relationship strength among the multiple users obtained by the acquisition unit 51 and influence of the multiple users, a user who predetermined information is to be pushed.

The pushing unit 53 is configured to push information to the user who predetermined information is to be pushed and that is selected by the selection unit 52.

It is worthwhile to note that the device implementation is corresponding to the previous method implementation. For ease of reading, detailed content in the previous method implementation is not repeatedly described in this device implementation, but it should be clear that the device in this implementation can correspondingly implement all content in the previous method implementation.

In a device for pushing information provided in this implementation of the present disclosure, first, multiple users who meet a predetermined condition are obtained; then, a user who predetermined information is to be pushed is selected from the multiple users based on relationship strength among the multiple users and influence of the multiple users; and finally, information is pushed to the user who predetermined information is to be pushed. At present, a user who predetermined information is to be pushed is directly selected and information is pushed to the user. By comparison, in this implementation of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

Figure 6:
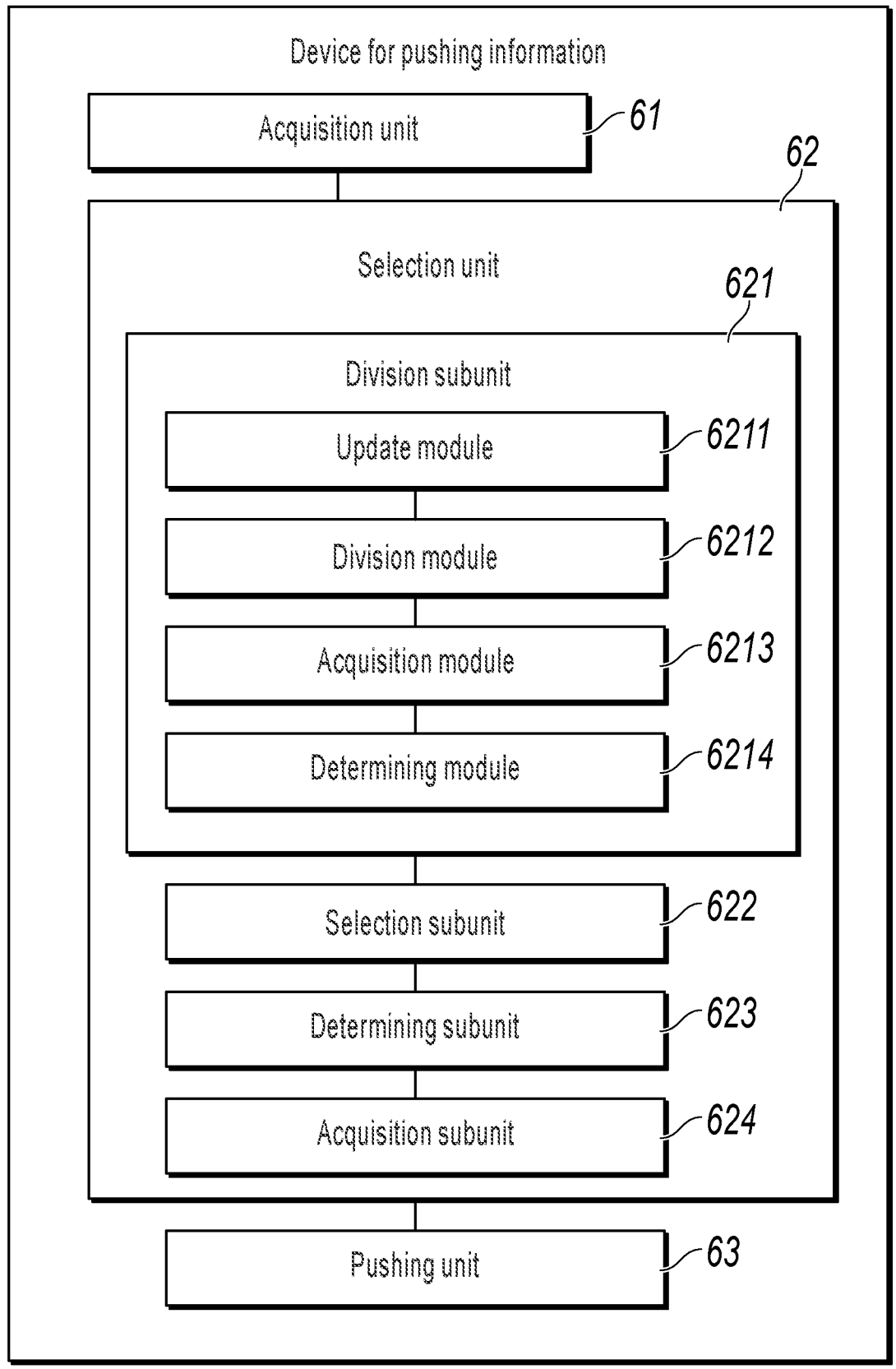
FIG. 6 shows a schematic structural diagram illustrating another device for pushing information, according to an implementation of the present disclosure.

Further, as a specific implementation of the method shown in FIG. 2, an implementation of the present disclosure provides another device for pushing information. As shown in FIG. 6, the device can include an acquisition unit 61, a selection unit 62, and a pushing unit 63.

The acquisition unit 61 is configured to obtain multiple users who meet a predetermined condition.

The selection unit 62 is configured to select, from the multiple users based on relationship strength among the multiple users obtained by the acquisition unit 61 and influence of the multiple users, a user who predetermined information is to be pushed.

The pushing unit 63 is configured to push information to the user who predetermined information is to be pushed and that is selected by the selection unit 62.

Further, the selection unit 62 includes a division subunit 621, a selection subunit 622, and a determining subunit 623.

The division subunit 621 is configured to divide the multiple users into different relation communities based on the relationship strength among the multiple users obtained by the acquisition unit 61, where relationship strength between users stored in each relation community is greater than a predetermined threshold.

The selection subunit 622 is configured to separately select, from the different relation communities obtained through division by the division subunit 621, a user whose influence meets a predetermined influence condition.

The determining subunit 623 is configured to determine the user whose influence meets the predetermined influence condition and that is selected by the selection subunit 622, as a user who predetermined information is to be pushed.

Further, the selection unit 62 further includes an acquisition subunit 624.

The acquisition subunit 624 is configured to obtain initial relation community labels of the multiple users.

The division subunit 621 includes an update module 6211 and a division module 6212.

The update module 6211 is configured to update the initial relation community label of each user in the multiple users obtained by the acquisition subunit 624, to a relation community label of a user whose relationship strength with the user is greater than the predetermined threshold.

The division module 6212 is configured to divide users with the same relation community label in the multiple users into the same relation community.

The division subunit 621 further includes an acquisition module 6213 and a determining module 6214.

The acquisition module 6213 is configured to obtain the number of relation community label updates of the user.

The determining module 6214 is configured to determine whether the relation community label update count of the user that is obtained by the acquisition module 6213 is greater than a predetermined count threshold.

The division module 6213 is configured to divide users with the same relation community label in the multiple users into the same relation community if the determining module 6214 determines that the relation community label update count of the user is greater than the predetermined count threshold.

The update module 6211 is further configured to update the relation community label of the user to a relation community label of a user whose relationship strength with the user is greater than the predetermined threshold, if the determining module 6214 determines that the relation community label update count of the user is less than or equal to the predetermined count threshold.

The selection subunit 622 is configured to: separately select, from the different relation communities, a user whose influence index information is greater than or equal to predetermined influence index information, when the influence is influence index information.

It is worthwhile to note that the device implementation is corresponding to the previous method implementation. For ease of reading, detailed content in the previous method implementation is not repeatedly described in this device implementation, but it should be clear that the device in this implementation can correspondingly implement all content in the previous method implementation.

In another device for pushing information provided in this implementation of the present disclosure, first, multiple users who meet a predetermined condition are obtained; then, a user who predetermined information is to be pushed is selected from the multiple users based on relationship strength among the multiple users and influence of the multiple users; and finally, information is pushed to the user who predetermined information is to be pushed. At present, a user who predetermined information is to be pushed is directly selected and information is pushed to the user. By comparison, in this implementation of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

Figure 7:
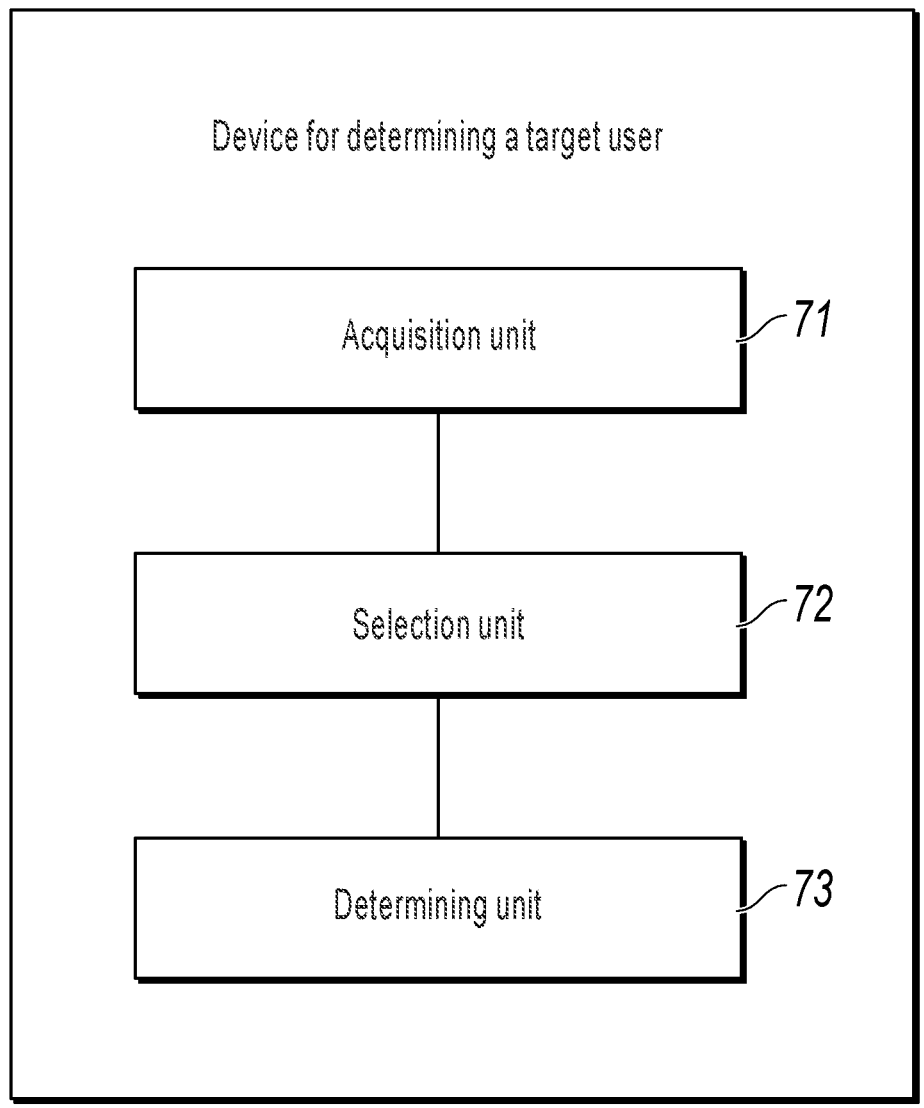
FIG. 7 shows a schematic structural diagram illustrating a device for determining a target user, according to an implementation of the present disclosure.

Further, as a specific implementation of the method shown in FIG. 3, an implementation of the present disclosure provides a device for determining a target user. As shown in FIG. 7, the device can include an acquisition unit 71, a selection unit 72, and a determining unit 73.

The acquisition unit 71 is configured to obtain multiple users who meet a predetermined condition.

The selection unit 72 is configured to select, from the multiple users based on influence respectively corresponding to the multiple users obtained by the acquisition unit 71, a user whose influence meets a predetermined influence condition.

The determining unit 73 is configured to determine the user whose influence meets the predetermined influence condition and that is selected by the selection unit 72, as a target user.

It is worthwhile to note that the device implementation is corresponding to the previous method implementation. For ease of reading, detailed content in the previous method implementation is not repeatedly described in this device implementation, but it should be clear that the device in this implementation can correspondingly implement all content in the previous method implementation.

In a device for determining a target user provided in this implementation of the present disclosure, first, multiple users who meet a predetermined condition are obtained; then, a user who predetermined information is to be pushed is selected from the multiple users based on relationship strength among the multiple users and influence of the multiple users; and finally, information is pushed to the user who predetermined information is to be pushed. At present, a user who predetermined information is to be pushed is directly selected and information is pushed to the user. By comparison, in this implementation of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

Figure 8:
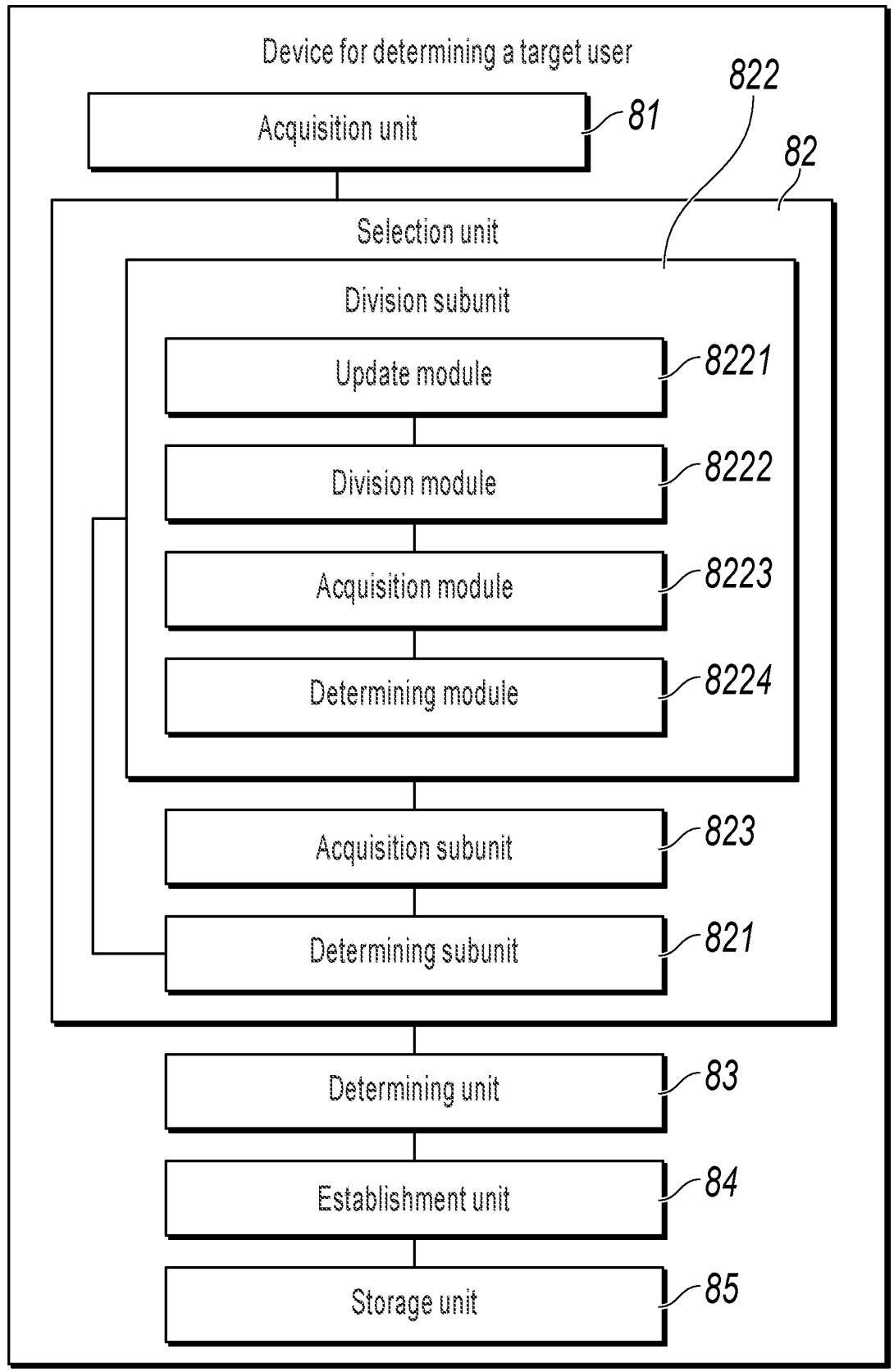
FIG. 8 shows a schematic structural diagram illustrating another device for determining a target user, according to an implementation of the present disclosure.

Further, as a specific implementation of the method shown in FIG. 4, an implementation of the present disclosure provides another device for determining a target user. As shown in FIG. 8, the device can include an acquisition unit 81, a selection unit 82, and a determining unit 83.

The acquisition unit 81 is configured to obtain multiple users who meet a predetermined condition.

The selection unit 82 is configured to select, from the multiple users based on influence respectively corresponding to the multiple users obtained by the acquisition unit 81, a user whose influence meets a predetermined influence condition.

The determining unit 83 is configured to determine the user whose influence meets the predetermined influence condition and that is selected by the selection unit 82, as a target user.

The acquisition unit 81 is configured to select, by using a predetermined scoring model, multiple users whose scores meet the predetermined condition.

The selection unit 82 includes a determining subunit 821.

The determining subunit 821 is configured to determine influence levels of the multiple users based on a predetermined influence level table and the influence respectively corresponding to the multiple users, where the predetermined influence level table stores influence threshold intervals respectively corresponding to different influence levels.

The determining subunit 821 is further configured to determine a user whose influence level is greater than or equal to a predetermined level in the multiple users, as a user whose influence meets the predetermined influence condition.

Further, the selection unit further includes a division subunit 822.

The division subunit 822 is configured to divide the multiple users into different relation communities based on relationship strength among the multiple users, where relationship strength between users stored in the relation community is greater than a predetermined threshold.

The determining subunit 821 is configured to determine a user whose influence level is greater than or equal to the predetermined level in the different relation communities, as the target user.

Further, the device further includes an establishment unit 84 and a storage unit 85.

The establishment unit 84 is configured to establish a mapping relationship between different influence levels and different influence threshold intervals.

The storage unit 85 is configured to store the mapping relationship in the predetermined influence level table.

Further, the selection unit further includes an acquisition subunit 823.

The acquisition subunit 823 is configured to obtain initial relation community labels of the multiple users.

The division subunit 822 includes: an update module 8221, configured to update the initial relation community label of each user in the multiple users to a relation community label of a user whose relationship strength with the user is greater than the predetermined threshold; and a division module 8222, configured to divide users with the same relation community label in the multiple users into the same relation community.

The division subunit 822 further includes an acquisition module 8223 and a determining module 8224.

The acquisition module 8223 is configured to obtain a relation community label update count of the user.

The determining module 8224 is configured to determine whether the relation community label update count of the user that is obtained by the acquisition module is greater than a predetermined count threshold.

The division module 8222 is configured to divide users with the same relation community label in the multiple users into the same relation community if the determining module 8224 determines that the relation community label update count of the user is greater than the predetermined count threshold.

The update module 8221 is further configured to update the relation community label of the user to a relation community label of a user whose relationship strength with the user is greater than the predetermined threshold, if the determining module 8224 determines that the relation community label update count of the user in the multiple users is less than or equal to the predetermined count threshold.

It is worthwhile to note that the device implementation is corresponding to the previous method implementation. For ease of reading, detailed content in the previous method implementation is not repeatedly described in this device implementation, but it should be clear that the device in this implementation can correspondingly implement all content in the previous method implementation.

In another device for determining a target user provided in this implementation of the present disclosure, first, multiple users who meet a predetermined condition are obtained; then, a user who predetermined information is to be pushed is selected from the multiple users based on relationship strength among the multiple users and influence of the multiple users; and finally, information is pushed to the user who predetermined information is to be pushed. At present, a user who predetermined information is to be pushed is directly selected and information is pushed to the user. By comparison, in this implementation of the present disclosure, multiple users whose scores meet a predetermined condition are selected by using a predetermined scoring model, and then a user who predetermined information is to be pushed is selected from the multiple users based on relationship strength among the multiple users and influence of the multiple users. As such, the selected user can be converted into an application program user who performs information pushing, and more application program users can be additionally obtained, thereby increasing advertisement budget benefits of the application programs and improving information pushing efficiency.

The device for pushing information includes a processor and a memory. The previously described acquisition unit, the selection unit, and the pushing unit are all stored in the memory as program units, and the processor executes the previous program units stored in the memory to implement corresponding functions.

The processor includes a kernel, and the kernel invokes a corresponding program unit from the memory. One or more kernels can be configured, and the problem of frame freezing when an image selected in a graph is displayed is resolved by adjusting a kernel parameter.

The memory can include a non-persistent storage, a random access memory (RAM), and/or a nonvolatile memory in a computer readable medium, for example, a read-only memory (ROM) or a flash memory (flash RAM). The memory includes at least one storage chip.

The present application further provides a computer program product. When the computer program product is executed on a data processing device, the computer program product can perform initialization of program code that includes the following steps: obtaining multiple users who meet a predetermined condition; selecting, from the multiple users based on relationship strength among the multiple users and influence of the multiple users, a user who predetermined information is to be pushed; and pushing information to the user who predetermined information is to be pushed.

A person skilled in the art should understand that the implementations of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the graphic display method, the device, and the computer program product based on the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a special-purpose computer, a built-in processor, or a processor of another programmable data processing device to generate a machine, so the instructions executed by the computer or the processor of the another programmable data processing device generate an apparatus for implementing a specific function in one or more flows in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more flows in the flowcharts and/or in one or more blocks in the block diagrams.

These computer program instructions can be loaded onto the computer or the another programmable data processing device, so a series of operations and steps are performed on the computer or the another programmable device, thereby generating computer-implemented processing. Therefore, the instructions executed on the computer or the another programmable device provide steps for implementing a specific function in one or more flows in the flowcharts and/or in one or more blocks in the block diagrams.

In a typical configuration, a computing device includes one or more processors (CPU), an input/output interface, a network interface, and a memory.

The memory possibly includes a non-persistent storage, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. Based on the definition in the present specification, the computer readable medium does not include transitory media (transitory media), for example, a modulated data signal and carrier.

The above-mentioned descriptions are merely the implementations of the present application, but are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 12:
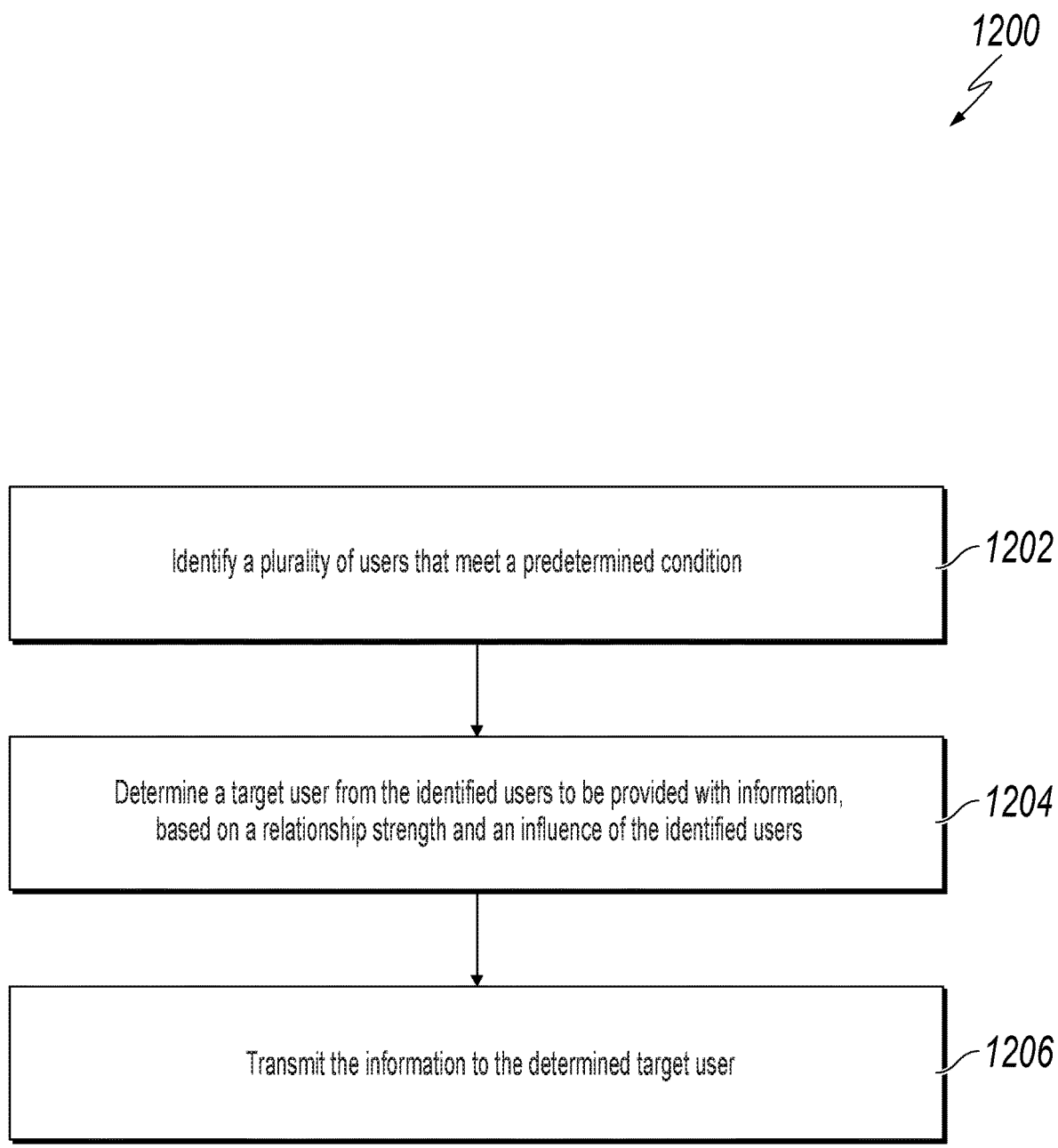
FIG. 12 is a flowchart illustrating an example of a computer-implemented method for pushing information, according to an implementation of the present disclosure.

FIG. 12 is a flowchart illustrating an example of a computer-implemented method 1200 for pushing information, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1202, a plurality of users are identified that meet a predetermined condition. The predetermined condition can be set based on a requirement of a user, or can be set based on a system requirement, which is not limiting. The multiple users can be multiple users whose scores meet a predetermined score condition. A user whose score meets the predetermined score condition can be selected by using a predetermined scoring model. The predetermined scoring model is generated based on user results and user attributes historically obtained by application programs. In particular, the one or more users are scored using the predetermined scoring model, and the user whose score meets or exceeds the predetermined condition from the potential users is selected. From 1202, method 1200 proceeds to 1204.

At 1204, a target user is determined or selected from the identified users to be provided with information, based on a relationship strength and an influence of the identified users. In particular, the relationship strength among the one or more users can be similarity among attribute information of the multiple users. The influence of a user refers to a capability strength that one user affects other users. The influence can also include the number of items of reading, sharing, and forwarding information published by the user by other users, for example.

In some implementations, the multiple users are divided into different relation communities based on relationship strength among the multiple users. The relation community can be a relation network community, and can be an online communication space such as a forum, a bulletin board, a group discussion, online chat, networking, personal space, and a wireless value-added service. Users in the same relation community have the same relation community label. A relationship strength between users stored in each relation community is greater than a predetermined threshold. The predetermined threshold can be set based on a requirement of a user or can be set based on a default system mode, for example. This step can additionally include obtaining initial relation community labels of the multiple users. Then, this step can include updating the initial relation community label of each user in the multiple users to a relation community label of a user whose relationship strength with the user is greater than the predetermined threshold, and dividing users with the same relation community label in the multiple users into the same relation community. From 1204, method 1200 proceeds to 1206.

At 1206, the information is transmitted to the determined target user. The predetermined information to be pushed can be advertisement information that is pushed by an application program provider based on advertisement budget. To avoid high costs on application program advertisements, many application program providers usually budget advertisement costs, that is, determine information pushing user data based on the advertisement budget and push information only to users in the information pushing user data.

When the influence use in step 1240 is influence information, 1206 can include separately selecting, from the different relation communities based on the influence index information, a user whose influence index information is greater than or equal to predetermined influence index information. The influence index can be the number of times that other users read, share, or forward information that is published by the user. The predetermined influence index threshold can be set based on a requirement of a user, or can be set based on a default system mode. The predetermined influence index threshold can be set based on a budget of predetermined information to be pushed, and this is not limiting. When the influence is the influence index information, a user is determined whose influence index information is greater than or equal to the predetermined influence index threshold, as the user to transmit the information. After 1206, method 1200 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
identifying, by one or more processing devices, a plurality of users, wherein identifying the plurality of users comprises:
obtaining asset data in one or more asset accounts of each sample user of a set of sample users, and filling in missing data in the asset data according to one or more predetermined rules,
identifying anomalous data in the asset data, and replacing the anomalous data with other data according to one or more additional predetermined rules,
based on the asset data in the one or more asset accounts of each sample user, obtaining a total asset amount of each sample user, wherein attribute data of each sample user comprises the total asset amount of the sample user,
converting attribute data of the set of sample users into a sparse matrix format,
training multiple scoring models using the converted attribute data of the set of sample users,
measuring scoring effects of each scoring model based on different combinations of data of the attribute data of the set of sample users,
selecting, as a predetermined scoring model, a scoring model of the multiple scoring models having scoring effects with a particular characteristic,
scoring attribute data, the attribute data comprising asset data, of potential users using the predetermined scoring model, to obtain a score for each potential user, and
selecting, as the identified plurality of users, potential users having a score that satisfies a predetermined score condition;
obtaining initial relation community labels of the identified plurality of users;
determining an updated relation community label for each user of the identified plurality of users, comprising:
determining that a relationship strength between a first user of the identified plurality of users and a second user of the identified plurality of users is larger than a threshold, and
responsive to determining that the relationship strength between the first user and the second user is larger than the threshold, assigning matching updated relation community labels to the first user and the second user;
dividing the identified plurality of users into a plurality of relation communities, wherein users of the identified plurality of users having matching updated relation community labels are assigned to a particular relation community, wherein each user of the identified plurality of users is assigned to a single relation community based on the updated relation community label of the user, and wherein at least one of the plurality of relation communities corresponds to membership in an online social network community;

selecting a plurality of target users from identified users of each particular relation community to be provided with information, wherein the plurality of target users are selected based on respective influences of the plurality of target users compared to respective influences of other identified users of the particular relation community, wherein an influence of each user comprises a strength with which the user affects other users; and transmitting the information to the selected plurality of target users over a network.

2. The computer-implemented method of claim 1, wherein the updated relation community labels are final updated relation community labels, and wherein determining the final updated relation community label for each user of the identified plurality of users further comprises:

updating, in a predetermined number of iterations, comparisons of relationship strength between the identified plurality of users, wherein the predetermined number of iterations is at least two, and wherein each iteration after a first iteration of the predetermined number of iterations comprises:

obtaining, for the first user, a previous relation community label based on a previous iteration to the iteration;

determining whether a relationship strength between the first user and another user of the identified plurality of users is larger than the threshold; and in response to determining that the relationship strength between the first user and the other user is larger than the threshold, assigning matching updated relation community labels to the first user and the other user, comprising one of changing the previous relation community label of the first user to match a previous relation community label of the other user, or changing the previous relation community label of the other user to match the previous relation community label of the first user, wherein an updated relationship community label of the first user based on a final iteration of the predetermined number of iterations is the final updated relation community label of the first user.

3. The computer-implemented method of claim 1, further comprising:

determining an influence level for each user in the identified plurality of users based on a predetermined influence level table.

4. The computer-implemented method of claim 3, wherein the predetermined influence level table comprises influence threshold intervals that correspond to different influence levels, the different influence levels divided into high, medium, sub-medium, and low.

5. The computer-implemented method of claim 1, wherein selecting the plurality of target users from each particular relation community to be provided with the information comprises:

selecting, as the plurality of target users, a matching proportion of the identified users of each relation community.

6. A non-transitory computer-readable storage medium coupled to one or more computers and configured with instructions executable by the one or more computers to perform operations comprising:

identifying, by the one or more computers, a plurality of users, wherein identifying the plurality of users comprises:

obtaining asset data in one or more asset accounts of each sample user of a set of sample users, and filling in missing data in the asset data according to one or more predetermined rules, identifying anomalous data in the asset data, and replacing the anomalous data with other data according to one or more additional predetermined rules, based on the asset data in the one or more asset accounts of each sample user, obtaining a total asset amount of each sample user, wherein attribute data of each sample user comprises the total asset amount of the sample user, converting attribute data of the set of sample users into a sparse matrix format, training multiple scoring models using the converted attribute data of the set of sample users, measuring scoring effects of each scoring model based on different combinations of data of the attribute data of the set of sample users, selecting, as a predetermined scoring model, a scoring model of the multiple scoring models having scoring effects with a particular characteristic, scoring attribute data, the attribute data comprising asset data, of potential users using the predetermined scoring model, to obtain a score for each potential user, and selecting, as the identified plurality of users, potential users having a score that satisfies a predetermined score condition;

obtaining initial relation community labels of the identified plurality of users;

determining an updated relation community label for each user of the identified plurality of users, comprising:

determining that a relationship strength between a first user of the identified plurality of users and a second user of the identified plurality of users is larger than a threshold, and responsive to determining that the relationship strength between the first user and the second user is larger than the threshold, assigning matching updated relation community labels to the first user and the second user;

dividing the identified plurality of users into a plurality of relation communities, users of the identified plurality of users having matching updated relation community labels are assigned to a particular relation community, wherein each user of the identified plurality of users is assigned to a single relation community based on the updated relation community label of the user, and wherein at least one of the plurality of relation communities corresponds to membership in an online social network community;

selecting a plurality of target users from identified users of each particular relation community to be provided with information, wherein the plurality of target users are selected based on respective influences of the plurality of target users compared to respective influences of other identified users of the particular relation community, wherein an influence of each user comprises a strength with which the user affects other users; and transmitting the information to the selected plurality of target users over a network.

7. The non-transitory computer-readable storage medium of claim 6, wherein the updated relation community labels are final updated relation community labels, and wherein determining the final updated relation community label for each user of the identified plurality of users further comprises:

> updating, in a predetermined number of iterations, comparisons of relationship strength between the identified plurality of users, wherein the predetermined number of iterations is at least two, and wherein each iteration after a first iteration of the predetermined number of iterations comprises:
> > obtaining, for the first user, a previous relation community label based on a previous iteration to the iteration;
> > determining whether a relationship strength between the first user and another user of the identified plurality of users is larger than the threshold; and
> > in response to determining that the relationship strength between the first user and the other user is larger than the threshold, assigning matching updated relation community labels to the first user and the other user, comprising one of
> > > changing the previous relation community label of the first user to match a previous relation community label of the other user, or
> > > changing the previous relation community label of the other user to match the previous relation community label of the first user,
> > wherein an updated relationship community label of the first user based on a final iteration of the predetermined number of iterations is the final updated relation community label of the first user.

8. The non-transitory computer-readable storage medium of claim 6, configured with instructions executable by the one or more computers to:

> determining an influence level for each user in the identified plurality of users based on a predetermined influence level table.

9. The non-transitory computer-readable storage medium of claim 8, wherein the predetermined influence level table comprises influence threshold intervals that correspond to different influence levels, the different influence levels divided into high, medium, sub-medium, and low.

10. The non-transitory computer-readable storage medium of claim 6, wherein selecting the plurality of target users from each particular relation community to be provided with the information comprises:

> selecting, as the plurality of target users, a matching proportion of the identified users of each relation community.

11. A system, comprising:
one or more computers; and
one or more computer-readable memories coupled to the one or more computers and configured with instructions executable by the one or more computers to perform operations comprising:

> identifying, by the one or more computers, a plurality of users, wherein identifying the plurality of users comprises:
> > obtaining asset data in one or more asset accounts of each sample user of a set of sample users, and filling in missing data in the asset data according to one or more predetermined rules,
> > identifying anomalous data in the asset data, and replacing the anomalous data with other data according to one or more additional predetermined rules, based on the asset data in the one or more asset accounts of each sample user, obtaining a total asset amount of each sample user, wherein attribute data of each sample user comprises the total asset amount of the sample user,
> > converting attribute data of the set of sample users into a sparse matrix format,
> > training multiple scoring models using the converted attribute data of the set of sample users,
> > measuring scoring effects of each scoring model based on different combinations of data of the attribute data of the set of sample users,
> > selecting, as a predetermined scoring model, a scoring model of the multiple scoring models having scoring effects with a particular characteristic,
> > scoring attribute data, the attribute data comprising asset data, of potential users using the predetermined scoring model, to obtain a score for each potential user, and
> > selecting, as the identified plurality of users, potential users having a score that satisfies a predetermined score condition;
> obtaining initial relation community labels of the identified plurality of users;
> determining an updated relation community label for each user of the identified plurality of users, comprising:
> > determining that a relationship strength between a first user of the identified plurality of users and a second user of the identified plurality of users is larger than a threshold, and
> > responsive to determining that the relationship strength between the first user and the second user is larger than the threshold, assigning matching updated relation community labels to the first user and the second user;
> dividing the identified plurality of users into a plurality of relation communities, wherein users of the identified plurality of users having matching updated relation community labels are assigned to a particular relation community, wherein each user of the identified plurality of users is assigned to a single relation community based on the updated relation community label of the user, and wherein at least one of the plurality of relation communities corresponds to membership in an online social network community;
> selecting a plurality of target users from identified users of each particular relation community to be provided with information, wherein the plurality of target users are selected based on respective influences of the plurality of target users compared to respective influences of other identified users of the particular relation community, wherein an influence of each user comprises a strength with which the user affects other users; and
> transmitting the information to the selected plurality of target users over a network.

12. The system of claim 11, wherein the updated relation community labels are final updated relation community labels, and wherein determining the final updated relation community label for each user of the identified plurality of users further comprises:

> updating, in a predetermined number of iterations, comparisons of relationship strength between the identified plurality of users, wherein the predetermined number of iterations is at least two, and wherein each iteration after a first iteration of the predetermined number of iterations comprises:
> > obtaining, for the first user, a previous relation community label based on a previous iteration to the iteration;

determining whether a relationship strength between the first user and another user of the identified plurality of users is larger than the threshold; and in response to determining that the relationship strength between the first user and the other user is larger than the threshold, assigning matching updated relation community labels to the first user and the other user, comprising one of changing the previous relation community label of the first user to match a previous relation community label of the other user, or changing the previous relation community label of the other user to match the previous relation community label of the first user, wherein an updated relationship community label of the first user based on a final iteration of the predetermined number of iterations is the final updated relation community label of the first user.

13. The system of claim 11, wherein the operations comprise:

determining an influence level for each user in the identified plurality of users based on a predetermined influence level table.

14. The system of claim 13, wherein the predetermined influence level table comprises influence threshold intervals that correspond to different influence levels, the different influence levels divided into high, medium, sub-medium, and low.

15. The system of claim 11, wherein selecting the plurality of target users from each particular relation community to be provided with the information comprises:

selecting, as the plurality of target users, a matching proportion of the identified users of each relation community.

* * * * *

UNITED STATES PATENT AND TRADEMARK OFFICE
CERTIFICATE OF CORRECTION

PATENT NO. : 11,074,623 B2  
APPLICATION NO. : 16/721857  
DATED : July 27, 2021  
INVENTOR(S) : Nian Song Page 1 of 1

It is certified that error appears in the above-identified patent and that said Letters Patent is hereby corrected as shown below:

On the Title Page

Column 2, Line 5, Abstract, delete "where in" and insert -- wherein --, therefor.

In the Claims

Column 24, Line 47, Claim 6, after "communities," insert -- wherein --.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*